(12) United States Patent
Revill et al.

(10) Patent No.: US 7,363,110 B2
(45) Date of Patent: Apr. 22, 2008

(54) GASKET WITH CURVED CONFIGURATION AT PERIPHERAL EDGE

(75) Inventors: Brian K. Revill, Runcorn (GB);
Michael F. Dutton, Warrington (GB);
Keith A. Stanley, Near Mold (GB);
Alan R. Naylor, Warrington (GB)

(73) Assignee: Ineos Chlor Enterprises Limited, Runcorn (GB)

( * ) Notice: Subject to any disclaimer, the term of this patent is extended or adjusted under 35 U.S.C. 154(b) by 0 days.

(21) Appl. No.: 11/730,710

(22) Filed: Apr. 3, 2007

(65) Prior Publication Data

US 2007/0187906 A1    Aug. 16, 2007

Related U.S. Application Data

(60) Continuation of application No. 10/724,184, filed on Dec. 1, 2003, now abandoned, which is a division of application No. 09/959,889, filed as application No. PCT/GB00/01645 on Apr. 28, 2000, now Pat. No. 6,761,808.

(30) Foreign Application Priority Data

May 10, 1999 (GB) .................................. 9910714.6

(51) Int. Cl.
*G06F 19/00* (2006.01)
(52) U.S. Cl. ...................... 700/245; 204/255; 204/257; 204/268; 204/279; 204/288; 204/288.1; 204/292; 204/293; 347/54; 701/23; 701/45

(58) Field of Classification Search ................ 700/245; 204/257, 255, 268, 279, 288, 288.1, 292, 204/293; 701/23, 45; 277/628
See application file for complete search history.

(56) References Cited

U.S. PATENT DOCUMENTS

| 222,388 | A | 12/1879 | Doty |
| 2,511,330 | A | 6/1950 | Custer |
| 4,026,565 | A | 5/1977 | Jelinek |
| 4,029,565 | A | 6/1977 | Bender et al. |
| 4,040,918 | A | 8/1977 | Johnson et al. |
| 4,108,752 | A | 8/1978 | Pohto et al. |
| 4,309,264 | A | 1/1982 | Bender et al. |
| 4,342,460 | A | 8/1982 | Eng |
| 4,557,816 | A | 12/1985 | Yoshida et al. |
| 4,643,818 | A | 2/1987 | Seko et al. |
| 4,664,770 | A | 5/1987 | Schmitt et al. |
| 4,732,660 | A | 3/1988 | Plowman et al. |
| 4,734,180 | A | 3/1988 | Sato et al. |
| 4,785,581 | A | 11/1988 | Abramson et al. |

(Continued)

FOREIGN PATENT DOCUMENTS

EP         052986       6/1982

(Continued)

*Primary Examiner*—Khoi H. Tran
*Assistant Examiner*—McDieunel Marc
(74) *Attorney, Agent, or Firm*—Jones Day (57) ABSTRACT

A gasket having the form of a frame is provided with a curved portion at an inner or outer periphery thereof. When used in combination with a similarly configured gasket, the two gaskets may together, upon compression, form a pinch seal. The curved portion may be provided with a chemically resistant material.

15 Claims, 7 Drawing Sheets

U.S. PATENT DOCUMENTS

| | | | |
|---|---|---|---|
| 4,894,128 A | | 1/1990 | Beaver |
| 4,923,582 A | | 5/1990 | Abrahamson et al. |
| 4,973,067 A | | 11/1990 | Fritz |
| 5,035,185 A | * | 7/1991 | Schultz ............... 105/424 |
| 5,225,060 A | | 7/1993 | Noaki et al. |
| 5,240,766 A | | 8/1993 | Foster |
| 5,322,604 A | | 6/1994 | Cawlfield |
| 5,454,925 A | | 10/1995 | Garland et al. |
| 5,518,257 A | * | 5/1996 | Breaker ................. 277/612 |
| 5,653,857 A | | 8/1997 | Getsy et al. |
| 6,089,572 A | | 7/2000 | Plunkett |
| 6,093,467 A | | 7/2000 | Forry |
| 6,481,722 B1 | | 11/2002 | Shaffer |
| 6,761,808 B1 | * | 7/2004 | Revill et al. ............ 204/257 |

FOREIGN PATENT DOCUMENTS

| | | |
|---|---|---|
| EP | 107934 | 5/1984 |
| EP | 129374 | 12/1984 |
| EP | 456295 | 11/1991 |
| EP | 479423 | 4/1992 |
| EP | 521386 | 1/1993 |
| EP | 546714 | 6/1993 |
| EP | 704556 | 4/1996 |
| GB | 1595183 | 12/1980 |
| GB | 1581348 | 8/1981 |
| HU | P9303530 A | 8/1994 |
| HU | P9903787 A | 10/1996 |
| WO | WO 95/05499 | 2/1995 |
| WO | WO 96/24705 | 8/1996 |
| WO | WO 98/55670 | 12/1998 |

* cited by examiner

GASKET WITH CURVED CONFIGURATION AT PERIPHERAL EDGE

CROSS REFERENCE TO RELATED APPLICATION

This application is a continuation of U.S. patent application Ser. No. 10/724,184, filed on Dec. 1, 2003 now abandoned, which is a Divisional of U.S. patent application Ser. No. 09/959,889, filed on Nov. 13, 2001 now U.S. Pat. No. 6,761,808 as a National Phase Application of International Application No. PCT/GB00/01645, filed on Apr. 28. 2000, which claimed priority to Great Britain Application No. 9910714.6, filed on May 10, 1999. Each of these applications, in their entirety, are herein incorporated by reference.

BACKGROUND OF THE INVENTION

The present invention relates to electrode structures for use in, for example, bipolar electrolysers, particularly a modular bipolar electrolyser, and also in fuel cells.

Monopolar filter-press type membrane electrolysers are well known, for example as described in our GB 1,595,183. Such electrolysers are readily made, inexpensive and easily assembled.

Bipolar electrolysers are known in the art, for example as described in our GB 1,581,348.

In bipolar electrolysers of conventional design for use in the electrolysis of aqueous solutions of alkali metal chloride the bipolar unit comprises an anode which is suitably in the form of a plate of a film-forming metal, usually titanium, the plate carrying an electrocatalytically active coating, for example a platinum group metal oxide, and a cathode which is suitably in the form of a perforated, eg foraminous plate of metal, usually nickel or mild steel, the anode and cathode being electrically conductively bonded to each other to form a bipolar unit. Separators are positioned between successive bipolar units arranged in series in the electrolyser so that the anode of one bipolar unit faces the cathode of the adjacent bipolar unit with a separator disposed therebetween. The electrolyser also comprises terminal anode and cathode units.

In operating an electrolytic cell of the bipolar type, it is advantageous to operate with as small a distance as possible between the anode and cathode (the anode/cathode gap) in order to keep ohmic losses, and hence the cell voltage to a minimum.

The separators are generally adjacent or even in contact with the cathode and in order to achieve a small anode-cathode gap without at the same time damaging the separator it is necessary to exercise considerable care in order to manufacture electrodes having a suitable degree of flatness and it is also necessary to maintain this flatness during the heat treatment involved in coating the electrode with an electrocatalytically-active coating. Furthermore, great care must be exercised in assembling units in a bipolar electrolyser if damage to the separators is to be avoided.

U.S. Pat. No. 4,557,816 discloses that uniform concentration distribution of electrolyte across the electrodes in the bipolar electrolyser described therein may be improved by the provision of certain vertical ducts on the side of the electrode away from the separator for liquid downflow.

U.S. Pat. No. 4,643,818 discloses that the electrical resistance of the bipolar electrolyser described therein may be lowered and uniform current density obtained by the use of certain rigid multi-contact electrical conductive means between individual cells in a bipolar electrolyser.

U.S. Pat. No. 4,734,180 discloses a bipolar-type electrolyser comprising bipolar units which are arranged back to back with an explosion-bonded titanium-iron plate disposed therebetween and in which conductive ribs are welded to the electrode and to the pan-shaped body U.S. Pat. No. 5,225,060 discloses that the formation of gas zones in the upper portions of anode and cathode structures of the bipolar electrolyser described therein may be prevented by the use of non-current-flowing space in the upper portion of the structures.

EP 0,704,556 discloses that the provision of gas-liquid separators at the top of the anode and cathode structures of the bipolar electrolyser described therein minimises pressure fluctuations, membrane deterioration and voltage variation.

WO 98/55670 discloses an element for a bipolar electrolyser the two sides of which are formed with flanges and opposed projections. The projections are preferably in form of truncated cones and are preferably arranged in the form of centred hexagons to improve lateral mixing of electrolyte. However, vertical mixing is achieved by downcomer ducts which decrease the active area of the electrode thus amplifying the current density variation across the electrode which is a particular problem when operating at high current density with a narrow or zero gap anode/membrane/cathode configuration with impurity-sensitive ion-exchange membranes.

EP 0 521 386 discloses a bipolar electrolyser comprising electrolytic cell units which comprise electrode partitions with mating recesses and projections with electrode meshes joined directly, or through a spring, to the projections. A stack of such upright electrolytic cell units are joined in series with an ion exchange membrane between adjacent electrolytic cell units to form an electrolytic cell assembly. However, whereas the recesses and projections ensure good lateral mixing of the electrolyte, vertical mixing is poor. Accordingly, to maintain concentration and temperature variation in the cell units within acceptable limits, energy-intensive pumped external recirculation is necessary with additional expensive pipework and tanks.

In electrolytic cells in which the anode-cathode gap is zero there is a tendency for pressure applied to the separator through the anode and cathode with which it is in contact to lead to deviations from uniformity, abrasion or even rupture, of the separator. This is particularly the case where the separator is an ion-exchange membrane where it is desirable to apply an even pressure to the membrane through the anode and cathode.

We have now devised an electrode structure for a bipolar electrolyser which allows very small or even zero anode/cathode gaps to be used in such electrolysers without damage to the separator, which minimises electrical resistance by using a short perpendicular current-carrying path length between electrodes and low resistance materials for almost the entire perpendicular current-carrying path length and which affords excellent current distribution throughout the electrode area. The electrode structure permits both horizontal and vertical flow of liquors therein aiding circulation and mixing thereof and has improved rigidity and strength which allows closer tolerance to be achieved in cell construction. The electrode structure is of simple construction and easy to fabricate.

SUMMARY OF THE INVENTION

According to the first aspect of the present invention there is provided an electrode structure for use, for example, in a bipolar electrolyser comprising (i) a pan with a dished recess and a flange around the periphery thereof for supporting gasket means for sealing a separator between the flanges in adjacent electrode structures, which separator is disposed between the surface of the anode of a first electrode structure and the surface of the cathode of a second electrode structure such that the anode surface is substantially parallel to and faces but is insulated and spaced apart from the cathode surface by the separator and is hermetically-sealed to the separator;

(ii) an electrically conductive plate spaced from the pan;

(iii) an inlet for liquor; and (iv) an outlet for fluids;

wherein the plate is electrically connected to the pan by a plurality of electrically-conductive members to which the electrically conductive plate is electroconductively attached and which provide electrically-conductive pathways between the pan and the electrically conductive plate with the proviso that, where the plate is an anode plate, it may optionally be directly electrically connected to the pan; and wherein, where the electrode structure is an anode structure, the dished recess is provided with a plurality of inwardly projecting projections and, where the electrode structure is a cathode structure, the dished recess is provided with a plurality of outwardly projecting projections such that the inwardly projecting projections in the dished recess of the pan of the anode structure mate with the outwardly projecting projections in the dished recess of the pan of an adjacent cathode structure in an assembly comprising a plurality of the electrode structures.

The electrically conductive plate is desirably a metal or alloy as is hereinafter more fully described. It will in general be of the same material as that of the pan. Thus where the electrode structure is to be used as an anode in the electrolysis of an alkali metal halide the electrically conductive plate may be made of a valve metal or an alloy thereof consisting principally of a valve metal. Where the electrode structure is to be used as a cathode in the electrolysis of an alkali metal halide the electrically conductive plate may be, for example, stainless steel, mild steel, nickel or copper.

It will be appreciated that where the electrically conductive plate is an anode for use in brine electrolysis it will bear an electrocatalytically-active coating.

The electrically conductive plate may have any suitable structure as is hereinafter more fully described. The precise structure is not critical.

In order that the pressure applied to the separator positioned between the electrically conductive plates of adjacent electrode structures in a module according to the present invention is applied evenly the electrically conductive plate is preferably flexible.

Preferably each projection in the dished recess is electro-conductively connected to an electrically conductive member such that the projections provide many current feed-points hence improving current distribution across the pan leading to lower voltage, lower power consumption and longer separator and electrode coating lives.

The projections in the dished recess are preferably spaced apart from each other in a first direction and in a direction transverse to the first direction. More preferably the projections are symmetrically spaced apart. For example, they may be spaced apart by an equal distance in a first direction, and spaced apart by an equal distance, which may be the same, in a direction transverse, for example substantially at right angles, to the first direction. Preferably the spacing apart of the projections is the same in both directions.

The projections in the dished recess may have a variety of shapes, for example dome, bowl, conical or preferably frusto-conical. As examples of methods of forming the projections may be mentioned inter alia vacuum forming, explosion forming, pressing or preferably by the application of a suitably shaped tool to the opposite surface of the recess.

There are typically about 20-200, preferably 40-100 projections/metre$^2$ on the dished recess of the pan of the electrode structure.

The height of the projections from the plane of the dished recess may for example be in the range 0.5-8 cms, preferably 1-4 cms, depending on the depth of the pan. The distance between adjacent projections on the recessed dish may for example be 1-30 cms centre to centre, preferably 5-20 cms. The dimensions of the electrode structure in the direction of current flow are preferably in the range 1-6 cm as measured from the electrically conductive plate to the base of the pan in order to provide short current paths which ensure low voltage drops in the electrode structure without the use of elaborate current carrying devices The electrically-conductive members to which the electrically conductive plate is electroconductively attached in the electrode structure preferably comprise posts.

Where the electrically-conductive member to which the electrically-conductive plate is attached is in the form of a post and is electrically connected to an inwardly projecting projection in the dished recess of the pan the length of the current pathway between the electrically conductive plate and the pan may be minimised.

Where the anode-post is made of titanium or an alloy thereof and the cathode-post is made of nickel or an alloy thereof the length of the electrically conductive pathway through the cathode-post is preferably greater than the length of the electrically conductive pathway through the anode post. Preferably the ratio of the length of the electrically conductive pathway through the cathode post to the length of the electrically conductive pathway through the anode post is at least 2:1, preferably at least 4:1 and more preferably at least 7:1. Typically the ratio is at least 10:1.

The length of the posts depends on the electrolyser design and whether the post is associated with an anode plate or a cathode plate. Typically the post length may be in the range of 0 to 10 cm, preferably 0 to 4 cm. Where the length is zero, it will be understood that the invention envisages a modified arrangement in which the electrically conductive plate, when intended to function as an anode plate, may be directly electrically connected to the associated pan or alternatively connected thereto through a current carrier as defined below.

Where the electrically-conductive members to which the electrically conductive plates are attached are in the form of posts, each post is preferably provided with a current-carrier, eg a ring, mesh, or wire-wool, adjacent the electrically conductive plate to make multi-point electrical contact therewith. Preferably the current-carrier is a multi-legged current-carrier, hereinafter referred to for convenience as a "spider". In some circumstances, it is envisaged that the electrical connections may be made without using a post; for instance, in the case of an anode structure, the apex of each inwardly directed projection may be electrically connected to the anode plate by means of a current carrier as aforesaid, e.g. a spider.

The provision of spiders increases the number and distribution of current feed points to the electrically conductive plate, hence improving current distribution leading to lower voltage and power consumption and longer life of separators and electrode coatings.

The length of the legs and the number thereof on the spider, where a spider is present, may vary within wide limits. Typically the spider contains between 2 and 100 legs, preferably between 2 and 8 legs. Typically each leg is between 1 mm and 200 mm long, preferably between 5 mm and 100 mm long. The skilled man by simple experiment will be able to determine suitable lengths and numbers of spider legs for any particular application.

A spider may be flexible or rigid. The shape and mechanical properties of the spiders in the anode structure may be the same as or different from the shape and mechanical properties of the spiders in the cathode structure. For example, relatively non-springy spiders with short legs are often preferred in the anode structure and relatively springy spiders with long legs are preferred in the cathode structure.

The use of spring-loaded spiders, at least at the cathode plate, enables the electrode structures to be spring-loaded to achieve zero gap operation with optimum pressure to minimise risk of separator/electrode damage. By "zero gap", we mean that there is substantially no gap between the electroconductive plate of the each electrode structure and the adjacent separator, i.e. so that adjacent electroconductive plates are in use only separated by the thickness of the separator.

Where the separator is a membrane, spring-loaded spiders provide more uniform support for the membrane across a larger area hence reducing movement which could lead to damage of the membrane by, for example, folding, abrasion or the onset of wrinkles.

A spider is preferably made from the same metal as the electrically conductive plate with which it is in electrical contact.

Typically, a spider is welded to the electrically conductive plate with which it is in electrical contact.

A spider may be attached to the post by methods known in the art, for example by welding, screw-fixing or push-fit connectors.

The legs of each spider may radiate from a central portion for use in attaching the spider to a post or, in some circumstances, directly to an apex of the associated projection. The spider legs may be equiangularly spaced.

According to a further aspect of the present invention there is provided a spider for use in an electrode structure which spider is electroconductively attached to an electrically-conductive member and to an electrically conductive plate such that current distribution to the electrically conductive plate is improved.

According to yet another aspect of the invention there is provided an anode or cathode assembly comprising an electrically conductive plate having attached to one face thereof a plurality of current-distributing spiders each comprising a portion for attachment, in use, to a pan and a number of legs radiating from the attachment portion whereby electrical current supply to the plate takes place through the such legs. Such an arrangement enables the anode or cathode assembly to be readily welded or otherwise secured within a cell compartment or module and removed for example for repair of the electrically conductive plate or replacement of any electrocatalytic coating thereon.

Where the post is provided with a current carrier, it may be further provided with an insulating cap on the end thereof adjacent the separator.

Where the electrode structure is an anode structure the pan thereof may be bonded back to back to the pan of an electrode structure which is a cathode structure such that the inwardly projecting projections in the pan of the anode structure mate with the outwardly projecting projections on the pan of the cathode structure to form a bipolar unit.

According to a further aspect of the present invention there is provided a bipolar unit wherein the pan of an electrode structure according to the present invention which is an anode structure is bonded to the pan of an electrode structure according to the present invention which is a cathode structure such that the inwardly projecting projections on the pan of the anode structure mate with the outwardly projecting projections on the pan of the cathode structure to form a bipolar unit.

In the bipolar unit according to the present invention the electrode structures are pressed or bonded together, preferably by welding, more preferably by explosion bonding, such that electrical contact is made between the dished recesses in the pans thereof.

A plurality of such bipolar units interspersed with appropriate separators, gaskets and pressing means may be assembled to form a filter-press bipolar electrolyser.

According to a yet further aspect of the present invention there is provided a filter-press bipolar electrolyser which comprises a) current distributing means; and b) at least one bipolar unit mounted on a mounting frame and assembled in series both mechanically and electrically, characterised in that the bipolar units are bipolar units according to the further aspect of the present invention.

By 'current distributing means' is meant systems, normally attached to the inside of the end frames of the electrolyser mounting frame, designed to carry current from a power source such as cellroom power feeder cables or busbars to the pans of the terminal electrodes of a filter press electrolyser or the outside pans of the end modules of the modular electrolyser, such that the current feed is evenly distributed over all the electrical contact points on these pans. Typically current distributing means can be single plates or systems of plates cables or wires made from conductive metals. Optionally, they may be fitted with conductivity enhancing coatings, attachments or devices to improve the electrical connection between the current distributing means and the end electrode. Alternatively, especially in a filter press electrolyser, the terminal electrodes may be permanently attached to the current distributing means for example by welding.

One preferred form of current distributing means which is particularly useful in the electrolyser of this invention involves a series of copper plates running vertically from the bottom to the top of the electrolyser end frame, the copper plates being electrically linked by all being connected at the bottom to a single horizontal copper bus bar. At one end of the electrolyser frame, where the copper plates are intended to connect to a pan which is part of an anode structure, they may be fitted with conductive outwardly projecting projections or conductive posts which mate with the inwardly projecting projections of the anode. At the other end of the electrolyser, where the copper plates are intended to connect to an pan which is part of a cathode structure, they may be flat or they may be fitted with inwardly projecting projections which mate with the outwardly projecting projections of the cathode. Optionally the copper plates of the current distributing means may be fitted with conductivity enhancing coatings or devices to improve electrical contact with the pan of the electrode structure.

The terminal electrodes in the filter-press bipolar electrolyser according to the present invention preferably comprise electrode structures according to the present invention.

Where the electrode structure according to the present invention provides the ends of a bipolar electrolyser it may be provided with means for feeding electric power thereto. For example, this means may comprise a projection which is suitably shaped for attachment to a bus-bar when the electrode structure is assembled into an electrolyser.

Typically, the filter-press bipolar electrolyser according to the present invention comprises up to 300 bipolar units.

Means to provide a load to hermetically seal filter-press bipolar electrolysers according to the present invention are known to the skilled man.

Modular bipolar electrolysers are known, for example as described in U.S. Pat. No. 4,108,752 and U.S. Pat. No. 4,664,770.

Modular bipolar electrolysers have the advantages that a lower compressive load is applied thereto than to conventional bipolar electrolysers since the load is needed to produce only electrical contact between adjacent modules not the sealing of each cell in the electrolyser. Use of a lower compressive load eliminates the need for massive end-plates and associated compression systems. Furthermore, the use of modules facilitates both the fabrication/assembly and the maintenance of a bipolar electrolyser.

U.S. Pat. No. 4,108,752 describes a modular bipolar electrolyser comprising a plurality of removable modules. Each module comprises a pair of matching pans, each pan having a dished recess and a peripheral flange surrounding the recess, the pans being connected together peripherally at the flanges such that the recess of each pan faces that of the connected pan. A generally planar separator is positioned between the pans. The recess of one pan and the corresponding planar side of the separator define a first structure and the recess of the other pan and the opposite side of the separator define a second structure. A planar electrode is positioned within each structure parallel to the plane of the separator and electrically and structurally connected to the corresponding pan, for example by posts. The bipolar filter-press electrolyser is assembled by aligning a plurality of the modules such that the planar exterior surfaces of the pans are parallel. At least one multi-contact conductive strip is interposed between facing pan surfaces of adjacent modules such that the planar exterior surfaces of the pans are parallel and when the modules are compressed together the conductive strips are sandwiched therebetween to establish a positive electrical contact between adjoining cells at a plurality of points.

U.S. Pat. No. 4,664,770 describes a module for a modular bipolar electrolyser comprising a housing formed of two structures each having a bottom side extending in a plane parallel to planes including an anode and a cathode. The anode and cathode are separated by a membrane and both the anode and the cathode have a plurality of perforated and unperforated sections arranged parallel. A metallic framework pattern reinforcement is positioned between the anode and an adjacent inner surface of the bottom side of one structure and between the cathode and an adjacent inner surface of the bottom side of the other structure. A contact strip is attached to an outer surface of each of the bottom sides, the contact strips of adjacent cells being electrically connected. Also provided are means for connecting each of the contact strips to the metallic reinforcement and the unperforated sections in the in the electrode in the attached structure. A partition membrane extends between the anode and the cathode in each of the modules and gasket means seal the structures to the membrane. Where an electrolyser is assembled by lining up a plurality of such modules with the aid of known tensioning devices electrical contact between adjacent modules is ensured by the electrically conducting contact strips.

We have now found that where the electrically-conductive members on which the electrically conductive plates are mounted in the electrode structures according to the present invention are in the form of load-bearing posts a module for a modular bipolar electrolyser can be prepared from such electrode structures. Such a module is easy to assemble and is particularly easy to mount and co-locate with other modules on an electrolyser frame. Good electrical connection between one module and the next is particularly easily achieved. The percentage of membrane area undergoing electrolysis is also significantly improved compared to known modular designs.

According to a preferred aspect of the present invention there is provided a module for use in a modular bipolar electrolyser comprising a) an anode structure comprising (i) a pan with a dished recess and a flange around the periphery thereof, (ii) an anode plate which, optionally has an electrocatalytically active surface, (iii) means, optionally comprising a plurality of electrically-conductive load-bearing members to which the anode is electroconductively attached, providing electrically-conductive pathways between the pan and the anode plate, (iv) an inlet for liquor and (v) an outlet for fluids;

b) a cathode structure comprising (i) a pan with a dished recess and a flange around the periphery thereof, (ii) a cathode plate which, optionally has an electrocatalytically active surface, (iii) a plurality of electrically-conductive load-bearing members to which the cathode is electroconductively attached and which provide electrically-conductive pathways between the pan and the cathode plate, (iv) inlet for liquor and (v) outlet for fluids;

c) a separator disposed between the anode plate and the cathode plate such that the anode surface is substantially parallel to and faces but is insulated and spaced apart from the cathode surface by the separator which thereby divides the module into separate anode and cathode compartments;

d) gasket means sealing the separator between the flanges on the periphery of the pans; and e) means to apply pressure to the gasket means to hermetically-seal the separator thereto characterised in that i) the dished recess of the pan of the anode structure is provided with a plurality of inwardly projecting projections and the dished recess of the pan of the cathode structure is provided with a plurality of outwardly projecting projections such that the inwardly projecting projections of the anode structure of a module mate with the outwardly projecting projections of the cathode structure of an adjacent module in a modular bipolar electrolyser comprising a plurality of the modules; and ii) optionally one or more bipolar units according to the present invention, preferably with electrically-conductive load-bearing posts, and associated separators interspersed between the anode and cathode structures.

It will be appreciated that by the inclusion of one or more bipolar units of this invention, together with associated gaskets and separators, between the anode structure and cathode structure of a module of this invention, and using similar means to apply pressure to hermetically seal the separators to the gaskets and the gaskets to the electrode structures, it is possible to create a 'hybrid module' which contains two or more anode structures and two or more cathode structures with two or more separators. It should be understood that the creation of hybrid modules is within the scope of our invention.

One benefit of the hybrid module is that reduced numbers of lifting operations are required within the operating environment of the cellroom leading to reduced safety risks and less electrolyser downtime for electrode structure or module replacement during maintenance or overhauls.

The means to apply pressure to the gaskets to hermetically-seal the separator thereto in the module is preferably provided by bolts through holes in the flanges. However, we do not exclude the possibility that alternative means to apply pressure may be used.

Where the electrically-conductive load-bearing posts in the module are provided with current carriers, each post is preferably provided with an insulating cap and more preferably a matching hole is formed in the electrically conductive plate, particularly where the electrically conductive plate is in the form of a mesh. Where a matching hole is formed in the electrically conductive plate the insulating cap is preferably in the form of a cushion.

According to a further preferred aspect of the present invention there is provided a modular bipolar electrolyser which comprises one or more modules assembled on a mounting frame in series both mechanically and electrically; and current distribution plates at each end of the electrolyser, characterised in that the modules are modules according to the preferred aspect of the present invention.

Electrically-insulating, load-transferring cushions are preferably disposed at the ends of the electrically-conductive load-bearing posts adjacent the electrically conductive plate in the modular bipolar electrolyser according to the present invention and, where the posts are load-bearing, at the ends of the posts adjacent the electrically conductive plate in the filter-press bipolar electrolyser according to the present invention. Such insulating cushions prevent mechanical damage to the membrane and, since electrolysis does not occur at these points, the membrane does not suffer from any electrolysis damage.

Such insulating cushions may be made from a non-conductive material which is resistant to the chemical environment within the cell, eg fluoropolymers such as PTFE, FEP, PFA, polypropylene, CPVC and fluoroelastomeric rubbers. The cushions may be provided on metal studs which are located between the posts and the electrically conductive plate with the cushion presented towards the separator or membrane.

In the modular bipolar electrolyser according to the present invention comprising a plurality of modules, the recessed dish of the anode pan of a module and the recessed dish of the cathode pan of an adjacent module are electrically joined, preferably at the apices of the projections.

Electrical conductivity between adjacent modules in the modular bipolar electrolyser may be achieved by the use of interconnectors or preferably by at least close contact between adjacent modules.

Electrical conductivity between adjacent modules may be enhanced by the provision of conductivity-enhancing materials or conductivity-enhancing devices on the outer surface of the pans. As examples of conductivity-enhancing materials may be mentioned inter alia conductive carbon foams, conductive greases and coatings of a high-conductivity metal, eg silver or gold.

Preferably electroconductivity-enhancing devices are used to improve electrical conductivity between adjacent modules. As examples of electroconductivity-enhancing devices may be mentioned inter alia electrically conductive bimetallic plates welded to the anode, explosion-bonded electrically conductive bimetallic plates, electroconductive metal devices, eg washers, or preferably electroconductive metal devices adapted to (a) abrade or pierce the surface of the pans by cutting or biting through any electrically-insulating coating thereon, eg an oxide layer, and (b) at least inhibit formation of an insulating layer between the device and the surface of the pan According to a further aspect of the present invention there is provided an electroconductive metal device adapted to (a) abrade or pierce the surface of the pans by cutting or biting through any electrically-insulating coating thereon, eg an oxide layer, and (b) at least inhibit formation of an insulating layer between the device and the surface of the pan (hereinafter referred to for convenience as "abrasion device").

The abrasion device is provided with one or more projections. As an example of an abrasion device may be mentioned a star-washer, eg provided with 18 projections. Preferably, however, the abrasion device is provided with not more than six projections. It is often preferred, for mechanical stability during assembly of an electrolyser, that the abrasion device is provided with at least three projections. Preferably such projections are provided on both sides of the abrasion device.

An abrasion device is preferably disposed in an inwardly projecting projection in the dished recess in the pan of an anode structure to provide electrical contact between the pan and the mating outwardly projecting projection in the dished recess on the pan of a cathode structure. Preferably abrasion devices are provided in each inwardly projecting projection in the anode.

The abrasion device may be made of an electrically conductive material which is hard enough to cut into at least one of the pans of the electrodes structure, particularly a titanium anode, to pierce any oxide coating thereon. As examples of suitable metals from which such abrasion devices may be prepared may be mentioned inter alia carbon steel, nickel, nickel alloy or preferably a beryllium/copper alloy.

The abrasion device may be attached to the anode, for example by screwing, welding, or pinning using a metallic, eg Ti, tab. Preferably such a device is attached such that it is free to rotate at least to a limited extent.

The abrasion device is preferably re-usable, ie it can be used to make repeated connections without replacement.

The present invention will hereinafter be more fully described by reference to the use of the various aspects thereof in chlor/alkali applications, eg brine electrolysis.

The number of modules and bipolar units in bipolar electrolysers according to the present invention will be chosen by the skilled man in the light of inter alia the required production volume, available power and voltage and certain constraints known to the skilled man.

Typically, a modular bipolar electrolyser according to the present invention comprises 1-300 modules.

The filter-press and the modular bipolar electrolysers according to the present invention may be operated at pressures between 50 and 600 kPa (0.5 and 6 bar), preferably between 50 and 150 kPa (500 and 1500 mbar).

An inlet-tube is provided at the bottom of the electrode structure, preferably extending from one side thereof to the other, to allow liquor to be charged thereto. For example, where the modular bipolar electrolyser is to be used for brine electrolysis inlet-tubes allow caustic to be charged to the cathode structure and brine to be charged to the anode structure. Preferably liquor is fed to the inlet-tube from one end only.

Ports are spaced along the inlet-tube, preferably equidistantly to improve liquor feed distribution across the electrode structure. Preferably the ports are formed such that where a baffle, as hereinafter more fully described, is provided in the electrode structure liquor discharged from the ports is directed into the recirculating stream generated by the baffle. The dimensions of the ports are such that pressure drop down the inlet-tube is minimised.

The number of ports in the inlet-tube for any particular application may be readily calculated by the skilled man. Typically, there are about 2-10, preferably about 6, ports per metre of the inlet-tube. Typically each port is of about 1-3 mm diameter, preferably about 2 mm diameter.

The supply-tube through which liquor is supplied to the inlet-tube is made of a non-conducting material and may be inserted into an inlet-tube to any depth, e.g. until it almost reaches the dead-end of the inlet-tube. In bipolar electrolysers the increased length of the non-conductive supply-tube increases the length of the liquor pathway between cells in the electrolyser hence reducing the chance of damage to the electrolyser by leakage-current corrosion.

The inlet-tubes are conveniently made of the same material as the electrode structures they feed. For example, where the anode is made of titanium or an alloy thereof the inlet-tube to the anode is preferably made of titanium or an alloy thereof and where the cathode is made of nickel or an alloy thereof the inlet-tube to the cathode is preferably made of nickel or an alloy thereof.

As examples of suitable non-conducting materials from which the supply-tube may be prepared may be mentioned fluoropolymers such as PTFE, FEP and PFA.

The presence of the electrically conductive plate(s) spaced apart from each other by the separator forms an electrolysis area in modular and filter-press bipolar electrodes.

Spent liquor and product gas are discharged from the electrode structure through a gas/liquid exit system comprising an exit slot, an outlet header in which gas/liquid separation occurs and an exit port. Damage to the separator caused by formation of a gas space adjacent the separator in the upper region of the electrolysis area is at least reduced, and often eliminated, by the provision of the outlet header in the non-electrolysis area above the electrolysis area in the electrode structure.

In the exit system, the gas/liquid mixture flows upwardly from the electrolysis area through an exit slot above the electrolyser compartments into the outlet header. The depth of the exit slot, which runs along substantially the entire width of the electrode structure, will be chosen in the light of inter alia the current density, electrode area and temperature such that the gas phase is dispersed as bubbles in a continuous liquid phase. The depth of the exit slot is typically about 5-50%, preferably about 10-30%, the depth of the electrode structure, ie the distance between the dished recess and the electrode plate.

The gas/liquid mixture separates out rapidly in the outlet header, which runs along substantially the entire width of the electrode structure. The cross-sectional area of the outlet header will be chosen in the light of inter alia the current density, electrode area and temperature such that stratified horizontal gas/liquid flow along the header, preferably with a smooth interface is maintained.

The gas and liquid streams leave the outlet header through one or more exit ports, preferably one exit port, more preferably disposed at one end thereof. The cross-sectional area of the exit port will be chosen in the light of inter alia the current density, electrode area and temperature such that annular film gas/liquid downflow through the exit port with a liquid film on the wall and a central gas core is preferably obtained.

The gas/liquid exit system described above has the advantage that the low pressure drop avoids depressing the gas/liquor interface into the electrolysis area of the electrode system consequently eliminating damage to the separator caused by the formation of a gas space adjacent the separator in the upper region of the electrolysis area. A further advantage of the gas/liquid exit system is the minimisation of pressure fluctuations which cause physical damage to the separator by abrasion from contact with the electrode plate. The liquid film on the wall of the exit tube provides a yet further advantage by increasing the resistance of the liquor pathway between cells in the electrolyser hence reducing the possibility of damage to the electrolyser by leakage-current corrosion.

In a preferred embodiment of the present invention, the gas/liquid exit header is in the form of a rectangular structure provided along substantially the entire width of the electrode structure. The back plate of the exit header is an upward extension of the back of the pan in the vertical direction of the electrode structure. The back plate is bent through 90 degrees perpendicular to the back of the pan in the direction of the electrode to form the top plate of the outlet header and through a further 90 degrees downward to form the front plate of the header such that the front of the header is substantially parallel to the back of the header. The plate may optionally be bent back through 90 degrees towards the back plate to form the bottom of the header and down through 90 degrees to form the front plate of the exit slot. Alternatively, the front plate of the exit slot may be a continuation of the front plate of the exit header.

At the bottom of the exit slot the front plate is bent through a further 90 degrees perpendicular to and away from the back plate to form the top plate of the pan. This top plate is then bent through a further 90 degrees upward to form the flange of the pan.

The height of the flange effectively defines the vertical gas/liquid flow pathway through the exit slot and the rectangular box above the flange forms the exit header. Typically, the height of the flange is about 20-80% of the height of the exit header.

The gaskets for sealing the separator between the flanges on the pans in bipolar electrolysers according to the present invention, which may be different in the anode and cathode structures, are made from a suitable material with appropriate chemical resistance and physical properties, eg a plasticised EPDM resin. Where a material does not have a suitable combination of chemical resistance and physical properties a gasket made from a material having suitable physical properties may be provided with a chemically resistant liner, eg made of PTFE, on its inner edge.

The gasket may be in the form of a frame, preferably continuous, such that when two gaskets are disposed either side of a separator and a load applied thereto via the pans hermetic sealing of the module is effected.

A gasket is disposed between the anode and the separator and between the cathode and the separator.

The frame may in plan be of any configuration capable of hermetically sealing the separator into the module or compartment. Typically the frame is of square or rectangular configuration. The cross-section of the frame may be of any configuration capable of effecting sealing with the separator; for instance, it may have a circular, triangular or square cross-section but it is preferably of rectangular cross-section with the dimension perpendicular to the gasket plane being smaller than the dimension in the plane of the gasket.

Conveniently the gasket frame cross-section includes a protrusion or nose around substantially the entire perimetral length of the frame for engagement with the separator, the protrusion or nose usually being provided at the inner and/or outer periphery of the frame.

The protrusion or nose may be of any suitable shape capable of effecting a pinch seal with the separator but is preferably of bulbous configuration, e.g. generally part-circular in cross-section.

In use, the separator will be engaged on each side thereof by a respective gasket so that the protrusions of the gaskets are in registry with each other and, when compressed, effect localised pinching of the gasket around the full perimeter of the gaskets to prevent seepage or "wicking" of cell liquors through or along the structure of the separator from inside the electrolysis compartment to locations external to the compartment. This design of gasket has been found to be particularly effective in preventing "wicking" of cell liquors especially when the separator is roughened or has an uneven surface (e.g. caused by the presence of a reinforcing mesh) or contains channels left by the dissolution of sacrificial components therein; or when the electrolysis compartment is running at a higher pressure than the outside atmosphere.

In a modification, each gasket may be provided with a nose or protrusion on the opposite side thereof for engagement with a respective flange of an electrode structure.

The gasket or frame may contain holes to accommodate sealing bolts, especially where the gasket is used in a module.

Where the gasket is provided with a chemical resistant liner as described above, the liner may extend over the pinch-effecting protrusion or nose.

Electrolysers according to the present invention may be operated at high current density, ie >4.5 kA/m$^2$.

The separator is preferably a substantially electrolyte-impermeable ion-exchange membrane. However, we do not exclude the possibility that it may be a porous electrolyte-permeable diaphragm.

Where the separator is an ion-exchange membrane it may be formed from any suitable ion-exchange membrane material Ion permselective membranes for chlor/alkali production are well known in the art. The membrane is preferably a fluorine-containing polymeric material containing anionic groups. Preferably it is an anion group-containing polymer containing all C—F and no C—H bonds. As examples of suitable anion groups may be mentioned $PO_3^{2-}$, $—PO_2^{2-}$, or preferably $—SO_3^-$ or $—COO^-$.

The membrane may be present as a mono- or multi-layer film. It may be reinforced by being laminated with or coated onto a woven cloth or microporous sheet. Furthermore, it may be coated on one or both sides with a chemically resistant particulate coating to improve wetting and gas release.

Where a membrane bearing a surface coating is employed in chloralkali applications the surface coating is typically formed from a metal oxide inert to the chemical environment, eg Zirconia.

Suitable membranes for chloralkali applications are sold, for example, under the tradenames "Nafion" by E I Du Pont de Nemeurs and Co. Inc., "Flemion" by the Asahi Glass Co. Ltd. and "Aciplex" by the Asahi Chemical Co. Ltd.

The separator is positioned between adjacent anode plates and cathode plates and thereby separates the anode structure from the cathode structure.

The anode/cathode gap is suitably in the range 3 mm to zero, preferably 1 mm to zero. Thus where the anode/cathode gap is zero the anodes and cathodes of the module are in contact with the separator.

In bipolar electrolysers equipped with a substantially impermeable ion-exchange membrane, aqueous alkali metal chloride solution is charged to the anode structures of the bipolar electrolyser and chlorine and depleted aqueous alkali metal chloride solution are discharged from the anode structures of the bipolar electrolyser and hydrogen and alkali metal hydroxide are discharged from the cathode structures of the bipolar electrolyser.

The anode plate in the electrode structure may be metallic and the nature of the metal will depend on the nature of the electrolyte to be electrolysed in the electrolyser. A preferred metal is a film-forming metal, particularly where an aqueous solution of an alkali metal chloride is to be electrolysed in the electrolyser. The film-forming metal may be one of metals titanium, zirconium, niobium, tantalum, or tungsten or an alloy consisting principally of one or more of these metals and having anodic polarisation properties comparable with those of titanium. It is preferred to use titanium alone or an alloy based on titanium and having anodic polarisation properties comparable with those of titanium.

The anode plate has a coating of an electro-conducting electrocatalytically-active material. Particularly in the case where an aqueous solution of an alkali metal chloride is to be electrolysed this coating may for example comprise one or more platinum group metals, that is platinum, rhodium, iridium, ruthenium, osmium and palladium.

Electroconducting electrocatalytically-active materials for use as anode coatings in an electrolyser are well known in the art, for example as described in our EP 0,052,986, EP 0,107,934 and EP 0,129,374.

Any suitable metal which is different from the film-forming metal of the anode may be used for the cathode plate in the electrode structure provided, of course, that the metal used for the cathode plate is conductive and is resistant to the electrolyte used in the electrolytic cell. Preferably the cathode plate is made of nickel or a nickel alloy or of another material having an outer face of nickel or nickel alloy. For example, the cathode plate may comprise a core of another metal, e.g. steel or copper, and an outer face of nickel or nickel alloy. Nickel or nickel alloy is preferred on account of the corrosion resistance of such materials in an electrolytic cell in which an aqueous alkali chloride solution is electrolysed and on account of the long term low hydrogen over-voltage of nickel or nickel alloy.

The cathode plate may be treated to increase its surface area, eg by grit-blasting.

The cathode plate may be provided with an electroconducting electrocatalytically-active coating. Electroconducting electrocatalytically-active materials for use as cathode coatings in an electrolyser are well known in the art, for example as described in our EP 0,479,423, WO 95/05499, WO 95/05498, EP 0,546,714, WO 96/24705, EP 0,052,986 and EP 0,107,934.

The disclosure in our aforementioned patent specifications are incorporated herein by way of reference.

The electrode plate may have any desired structure. For example it may comprise a plurality of layers. Preferably, however, each electrode plate is a foraminated plate, ie it may be perforated, or it may be in the form of an expanded metal, or it may be woven or non-woven, or a louvred or lantern blade. More preferably the anode and the cathode plates are in the form of meshes.

As mentioned hereinbefore, the pan in an electrode structure will in general be of the same material as the electrically conductive plate. The material of the pan is typically of a thickness such that the pan is flexible and preferably resilient.

One or more baffles are preferably provided in the anode and cathode structures to form a first channel between a first side of the baffle and the electrode plate and a second channel between the second side of the baffle and the recessed dish of the pan, the first and second channels being in communication with each other, preferably at least at or adjacent the top and bottom of the electrode structure. The first channel provides a riser for the gas-filled brine to ascend to the outlet header at the top of the electrode structure. The second channel provides a downcomer for the degassed brine to fall to the bottom of the electrode structure. The baffles are preferably disposed vertically. The baffles utilise the gas-lift effect of the generated gas to enhance liquor circulation and mixing which produces certain advantages.

Improved mixing in the anode and cathode structures minimises concentration and temperature gradients within the structures thus increasing anode coating and membrane lifetime. In particular, in the anode structure the improved mixing allows the use of highly acidic brine to obtain low levels of oxygen in chlorine without the risk of damage to the membrane via protonation. The improvement in mixing in the cathode structure allows direct addition of de-ionised water to keep the concentration of caustic level constant after concentrated caustic is removed.

The provision of an inclined baffle plate in the upper region of the electrode structure further increases gas/liquid separation by accelerating the upward flow of the gas/liquid mixture from the electrolysis area thus enhancing gas bubble coalescence.

The baffles are made of material which is resistant to the chemical environment in the cell. The baffles in the anode structure may be made of a fluoropolymer or a suitable metal, for example titanium or an alloy thereof. The baffles in the cathode structure may be made of a fluoropolymer or a suitable metal, for example nickel.

In the anode structure the baffles, where present, are preferably attached to the inwardly projecting projections in the anode pan. In the cathode structure the baffles, where present, are preferably attached to the posts.

A baffle may be a one-piece structure extending fully across the electrode structure in the horizontal direction or preferably comprises a plurality of pieces, eg two, each of which extends across the electrode structure with a horizontal gap between them. Where a two-piece baffle is used the lower piece promotes recirculation of the liquor and the upper piece assists in maintaining a region at the top of the structure for foam collapse when operating at high current densities.

In operation a plurality of bipolar electrolysers according to the present invention may be arranged such that they are electrically fed from the same rectifier.

Liquor is preferably fed in parallel to all the modules in the modular bipolar electrolyser according to the present invention from the same brine and caustic headers.

Exit brine and exit caustic liquors preferably leave in parallel from all the modules in the modular bipolar electrolyser according to the present invention to common brine and caustic headers.

The modules in the modular bipolar electrolyser according to the present invention are mounted in a current-carrying frame and held together by any convenient means, for example screw, jack, hydraulic, pneumatic means.

The modular and filter-press bipolar electrolysers according to the present invention are especially useful in the manufacture of chlorine by the electrolysis of aqueous alkali metal chloride solutions, especially sodium chloride The electrode structure according to the present invention may be used as a current distribution device in an electrolytic cell equipped with an ion exchange membrane which is a so-called solid polymer electrolyte.

The present invention has been described with reference to an electrode structure suitable for use in an electrolyser for the electrolysis of aqueous alkali metal halide solution. It is to be understood, however, that the electrode structure may be used in electrolysers in which other solutions may be electrolysed, or in other types of electrolytic cells, for example in fuel cells.

According to a further aspect of the present invention there is provided an electrode structure comprising (i) a pan with a dished recess and a flange around the periphery thereof for supporting gasket means for sealing a separator between the flanges in adjacent electrode structures, (ii) an electrically conductive plate spaced from the pan;

(iii) means, optionally comprising a plurality of electrically-conductive members to which the electrically conductive plate is electroconductively attached, providing electrically-conductive pathways between the pan and the electrically conductive plate; characterised in that (a) the electrically-conductive members, when present, are in the form of posts; and (b) where the electrode structure is an anode structure the dished recess is provided with a plurality of inwardly projecting projections and where the electrode structure is a cathode structure the dished recess is provided with a plurality of outwardly projecting projections.

BRIEF DESCRIPTION OF THE DRAWINGS

The present invention is further illustrated by reference to, but is in no way limited by, the following drawings, in which.

DETAILED DESCRIPTION OF THE EBODIMENTS

Figure 1:
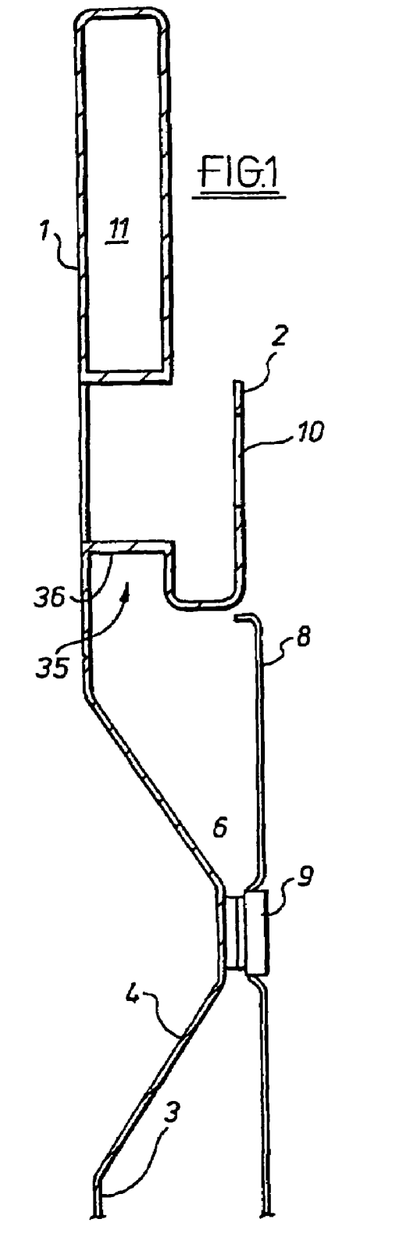
FIG. 1 is a cross-section of the top part of the electrode structure according to the present invention in the form of an anode structure.
Figure 2:
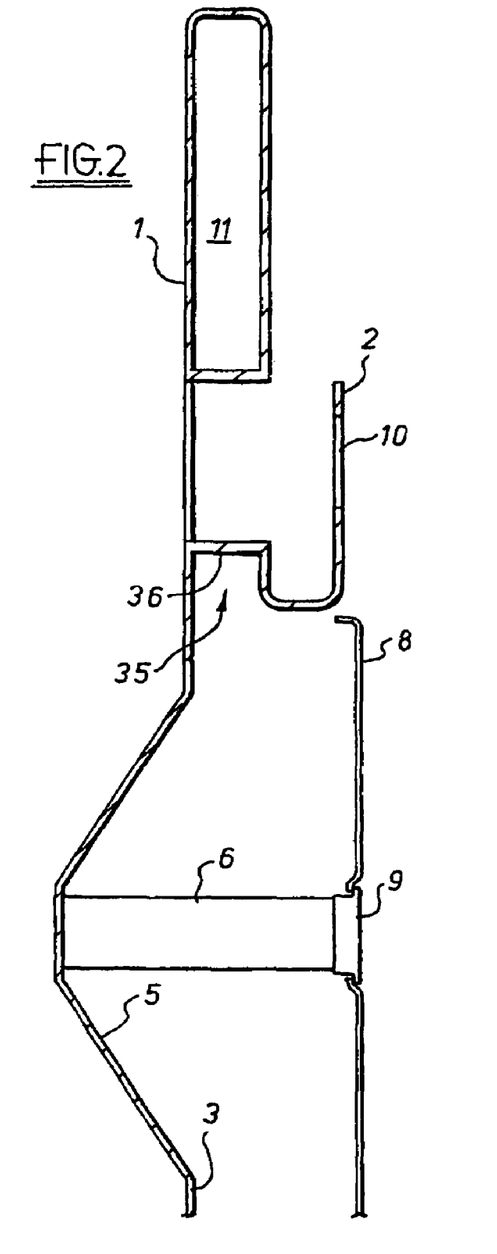
FIG. 2 is a cross-section of the top part of the electrode structure according to the present invention in the form of a cathode structure.

In FIGS. 1 and 2, a pan (1) is formed with a flange (2) and dished recess (3) in which are formed inwardly projecting frusto-conical projections (4) (in FIG. 1) or outwardly projecting frusto-conical projections (5) (in FIG. 2). An electrically conductive post (6) on which a spider (not shown) is mounted is electrically connected to each projection (4) or (5). It will be observed that the posts associated with the cathode structure are considerably longer than those associated with the anode structure. In the case of the anode structure, the posts may be omitted altogether in which case the anode plate may either be directly connected to the associated pan or it may be connected thereto directly through the spiders. An electrode plate (8), typically in the form of a mesh, is connected to the spiders. An electrically insulating cushion (9) is provided between the end of the post (6) and the electrode plate (8). At the location of each post, the plates (8) are apertured and the cushions (9) are received within such holes. The flanges (2) are provided with backing flanges (2B, see FIG. 4) and holes (10, 10B) designed to accept bolts (not shown) for bolting an anode structure and a cathode structure with two gaskets and a membrane to form a module according to the present invention. (11) is an outlet header. Liquor flow into the header (11) takes place through an exit slot (35) at the upper end of each electrode structure, the exit slot (35) being formed located immediately above the electrode plate (8) and just below spaced apart cylindrical stub tubes (36) which register with holes in the pan base (3) and the flange (2) and span the main vertically extending walls of the header (11). Thus liquor flow enters the exit slot and flows around the stub tubes (36) into the header (11).

Figure 3:
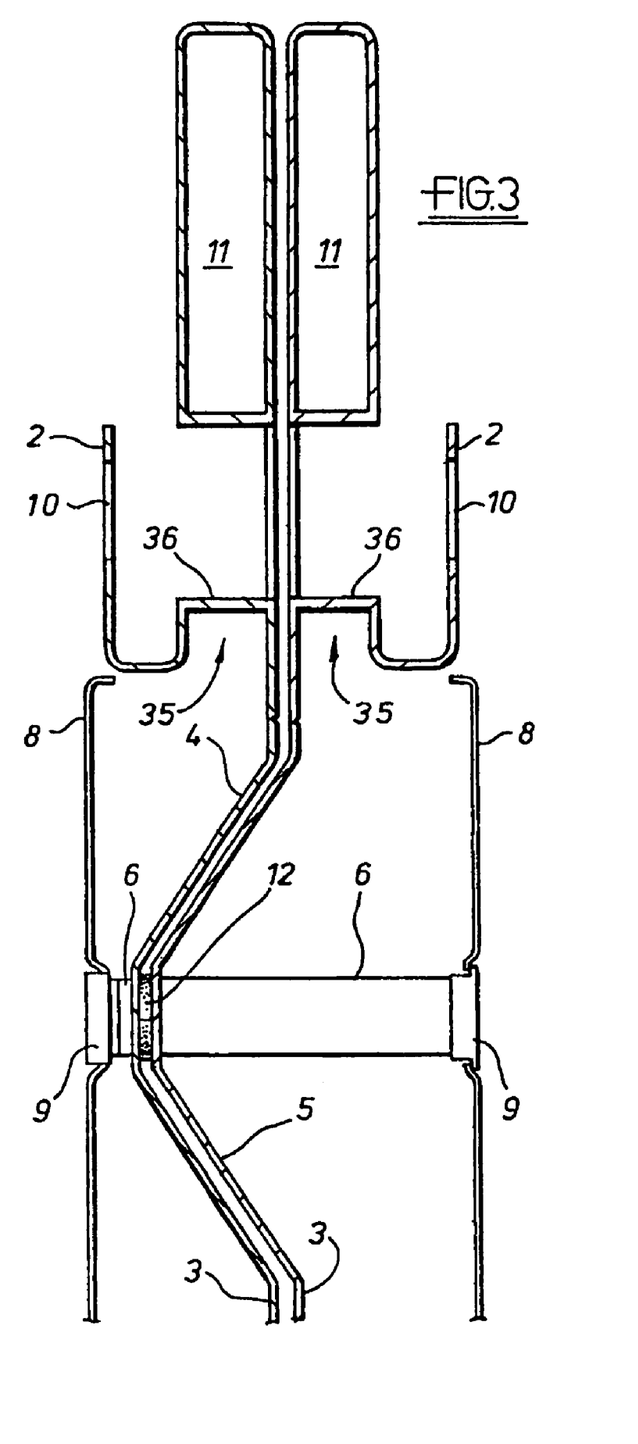
FIG. 3 is a cross-section of the top part of the bipolar unit according to the present invention.
Figure 4:
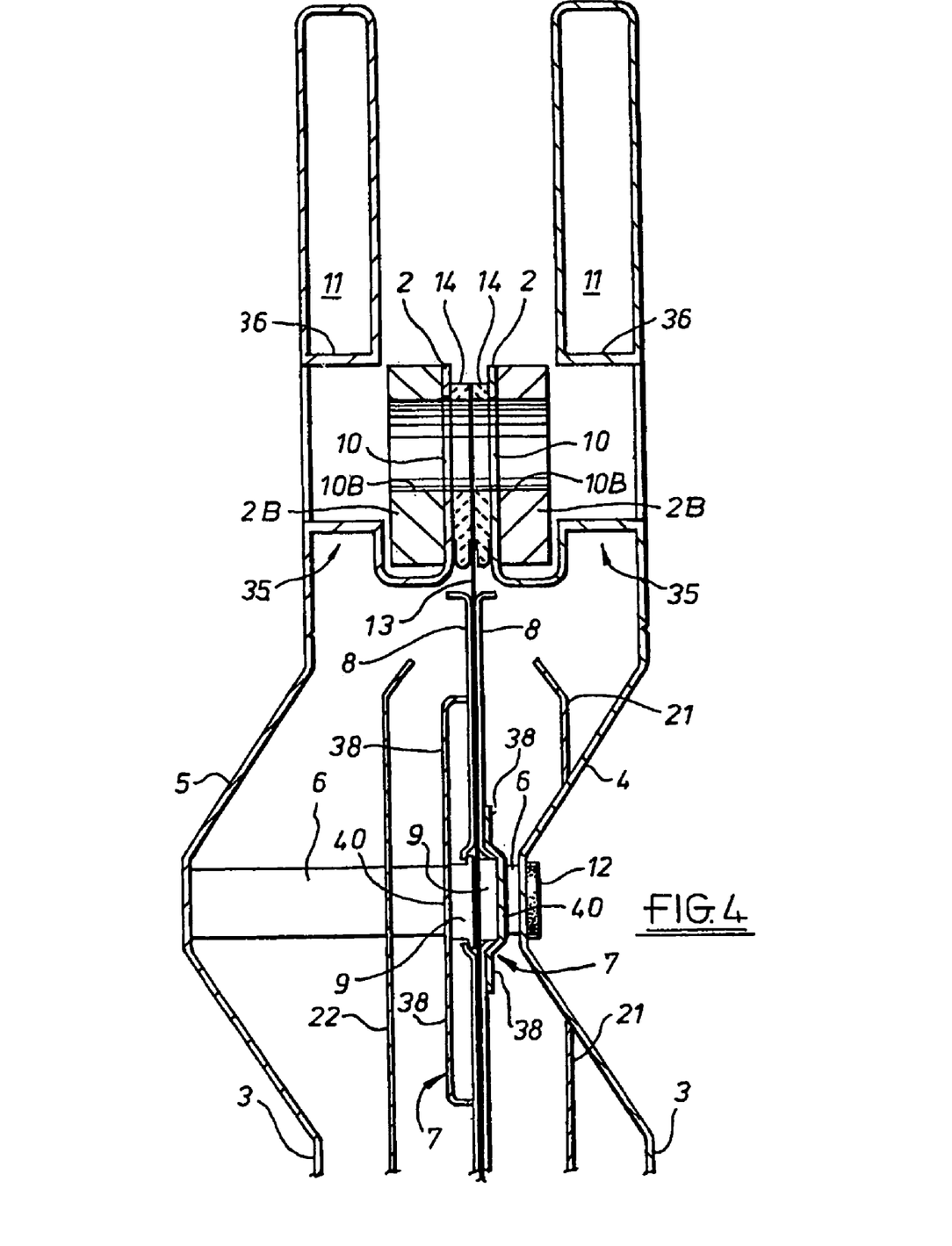
FIG. 4 is a cross-section of the top part of the module according to the present invention.

The electrode structures of the present invention may be used in filter press electrolysers, modular cells and fuel cells. FIG. 3 illustrates a unit in which two electrode structures are coupled to form a bipolar electrode assembly for use in a filter press electrolyser or a fuel cell, the electrode structures in this case being assembled with the anode and cathode projections (4, 5) nested. FIG. 4 illustrates a unit in which the electrode structures are coupled together with a separator therebetween for use in a modular electrolyser or in a fuel cell. In both cases, it will be understood that once a number of the units have been assembled, the net effect will be that adjacent anodes and cathodes, whether part of the same unit or parts of separate units, will have their projections (4) nested with each other.

Referring to the bipolar electrode assembly of FIG. 3, an anode structure as illustrated in FIG. 1 and a cathode structure as illustrated in FIG. 2 are electrically conductively joined back-to-back by an abrasion device (12) disposed between the inwardly projecting frusto-conical projection (4) on the anode structure and the outwardly projecting frusto-conical projection (5) on the cathode structure, the arrangement being such that when the two structures are urged together, the abrasion devices afford good electrical continuity between the peaks of the cathode projections (5) and the bases of the anode projections (4) and hence between the posts (6) extending to the electrode plates (8).

Referring to the modular electrode assembly of FIG. 4, an anode structure as illustrated in FIG. 1 and a cathode structure as illustrated in FIG. 2 are joined by bolts (not shown) through the holes (10) in flanges (2). A membrane (13) is sealed between two gaskets (14) disposed between flanges (2). Spiders (7)—not shown in FIGS. 1 to 3—provide electroconductive pathways between the posts (6) and the electrode plates (8). The spiders comprise disc-shaped central sections (40) which are connected to the ends of the posts (6), e.g. by welding, screw-fixing or push-fit connectors, and a number of legs (38) which radiate from the central section (40) and are connected at their free ends, e.g. by welding to the associated electrode plate (8). Usually the legs (38) are equiangularly spaced so that the current supply via the posts (6) is distributed to a number of equispaced points surrounding the post. Especially when intended for use in the electrolysis of alkali metal halides, the cathode spiders may be fabricated from materials such as stainless steel, nickel or copper while the anode spiders are fabricated from a valve metal or alloy thereof. The legs (38) of the spiders (7) associated with the anode structure are somewhat shorter than those associated with the cathode structure.

In practice, during the production of the electrode structures, the spiders (7) may be welded or otherwise connected to the plates (8) and the spiders may then be subsequently welded or otherwise secured to the posts (6). This arrangement facilitates replacement or repair of the anode/cathode plates or renewal/replacement of any electrocatalytically-active coating thereon.

Figure 5:
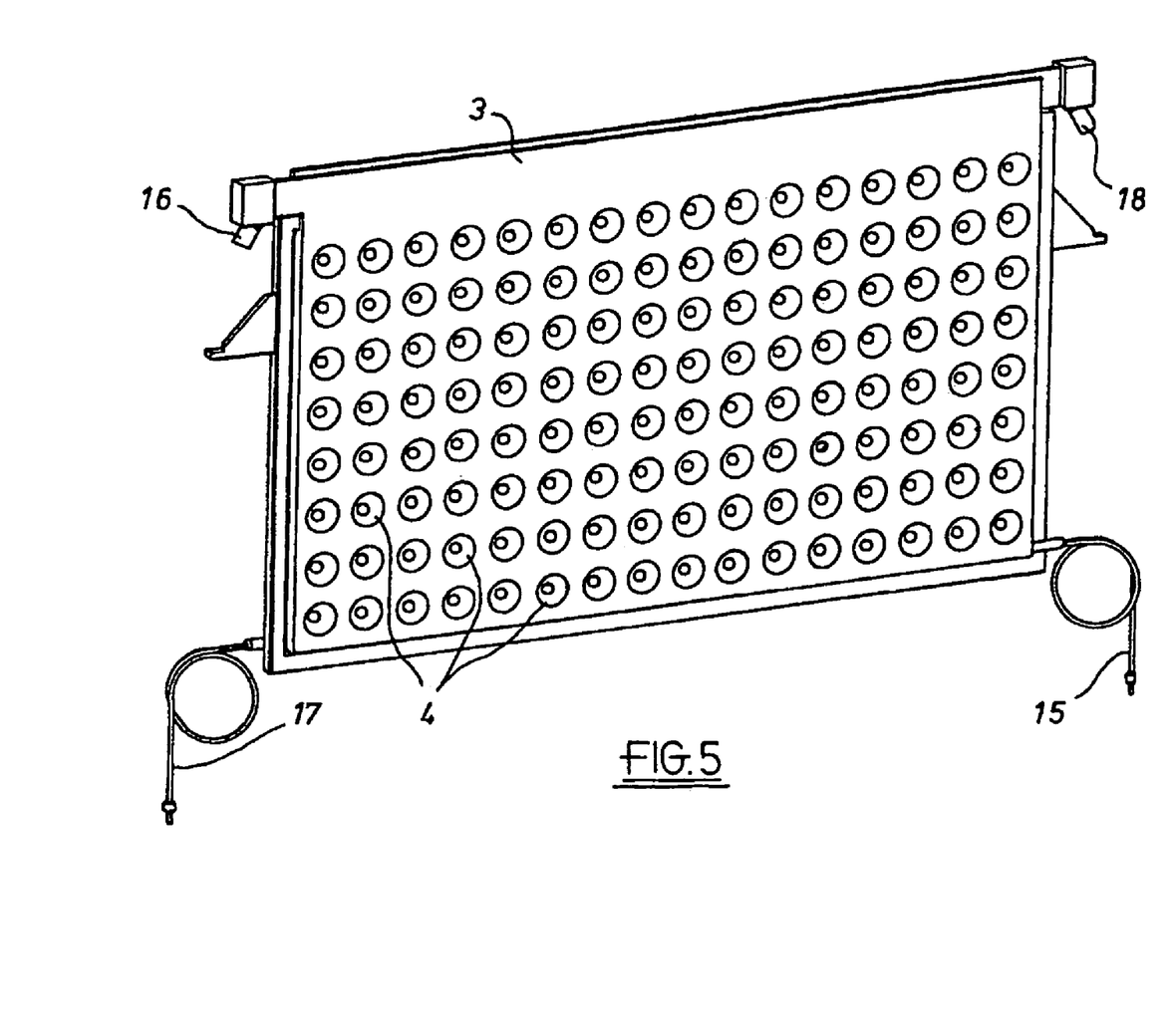
FIG. 5 is an isometric view looking at the anode structure of the module according to the present invention.

As shown in FIG. 5, the anode structure, with its inwardly projecting frusto-conical projections (4) in the pan (3), is provided with a supply tube (15) leading to the inlet tube (not shown) for brine and an outlet tube (16) for chlorine and depleted brine mixture. The cathode structure is provided with a supply tube (17) leading to the inlet tube (not shown) for caustic and an outlet tube for hydrogen and caustic mixture (18).

Figure 6:
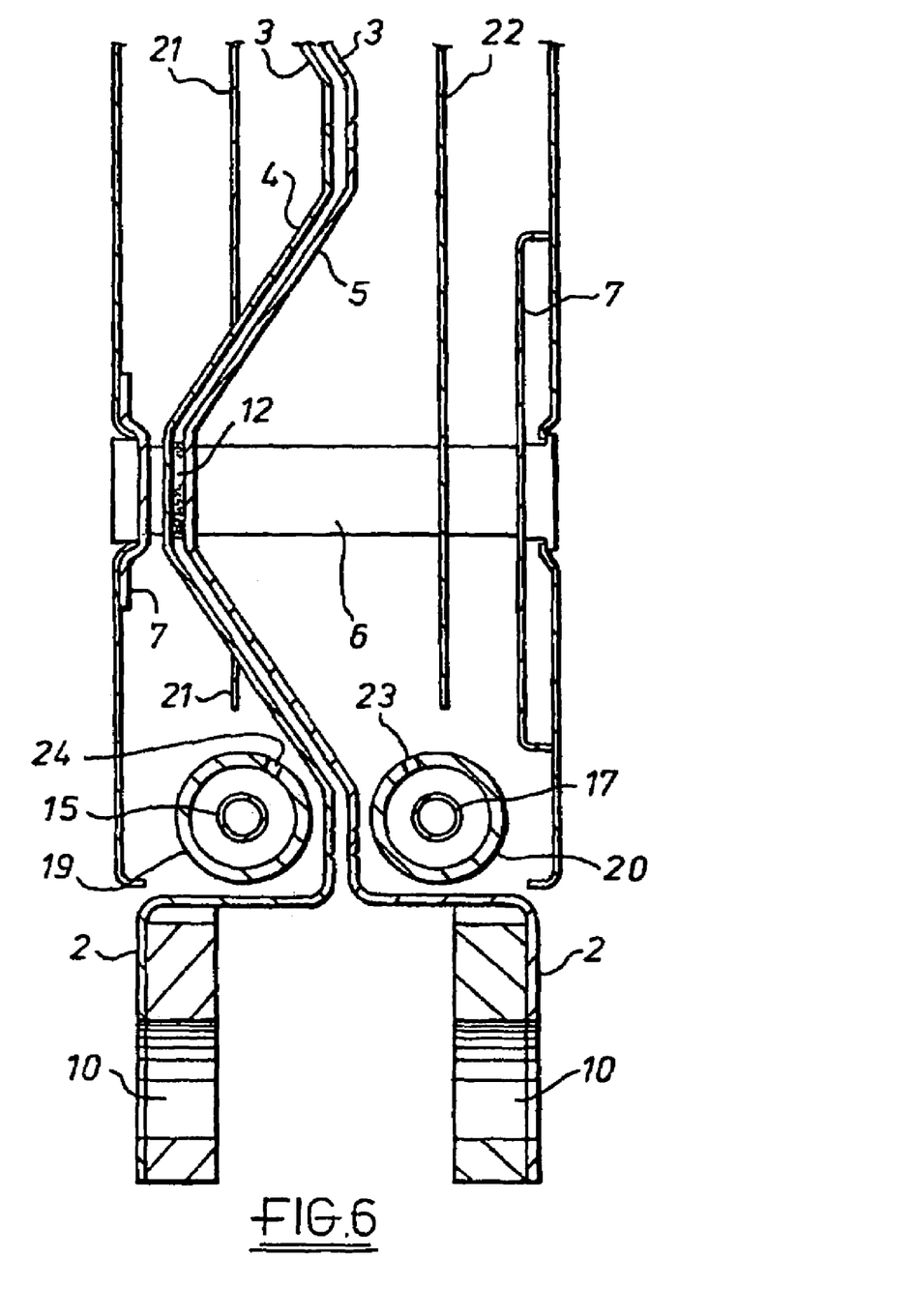
FIG. 6 is a cross-section of the bottom part of the module according to the present invention.

As shown in FIG. 6, the anode structure is provided with (a) an anode supply tube (15) concentric with the inlet tube (19) formed with ports (24) and (b) baffles (21) mounted on the inwardly projecting projections (4). The cathode structure is provided with (a) cathode supply tube (17) concentric with the inlet tube (20) formed with ports (23) and (b) baffles (22) mounted on the posts (6). The ports 24, 23 in inlet tubes (19) and (20) are formed such that liquor discharged therefrom is directed towards the back of the pans behind baffles (21) and (22) to aid mixing. The baffles 21, 22 serve to partition the anode and cathode compartments into two communicating zones to provide liquor recirculation as previously described. The baffles 21, 22 (not shown in FIGS. 1 to 3) extend vertically within the anode and cathode compartments from the lower end of the electrode structure to the upper ends thereof and form two channels within each electrode structure which communicate at least adjacent the top and bottom of the structure.

Figure 7:
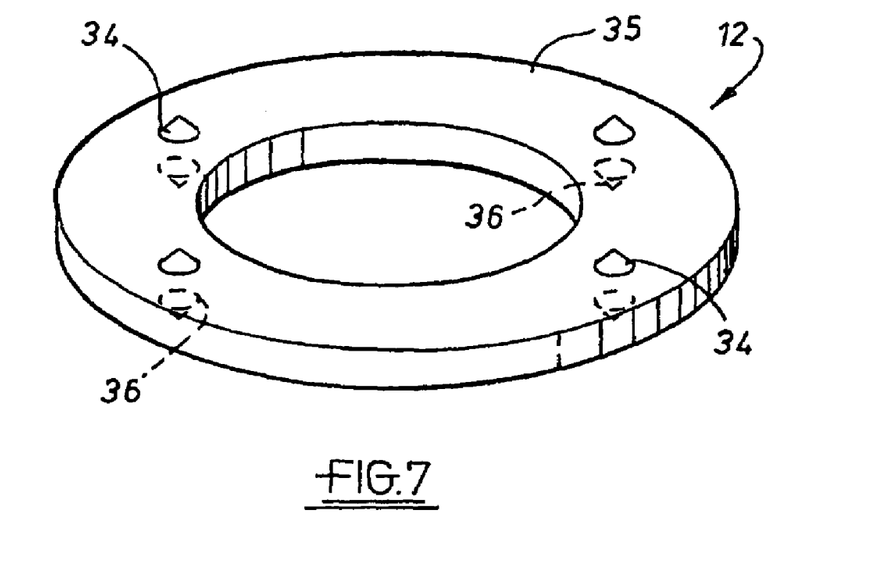
FIGS. 7 and 8 are respectively an isometric view and an end-view of an abrasion device.
Figure 8:
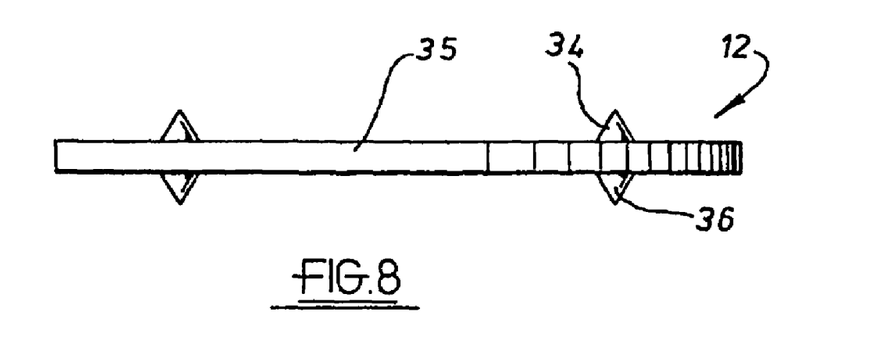

As shown in FIGS. 7 and 8, an abrasion device (12) is provided with four sharp projections (34) on one face of the washer (35) and four sharp projections (36) on the other face of the washer (35) so that when adjacent cathode and anode structures are loaded in compression, the projections bite into the material of the cathode and anode pans.

Figure 9:
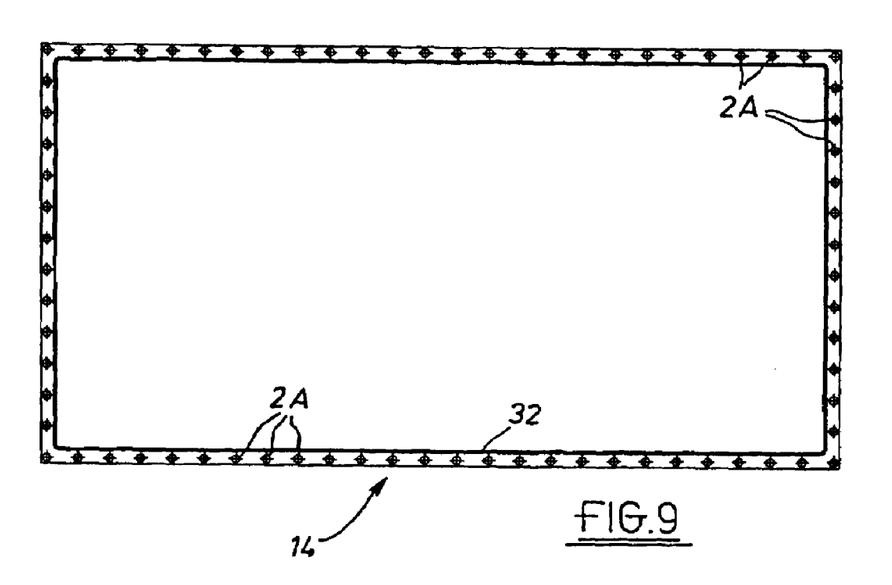
FIG. 9 is a view of one embodiment of gasket for use with electrode structures of the invention.
Figure 10:
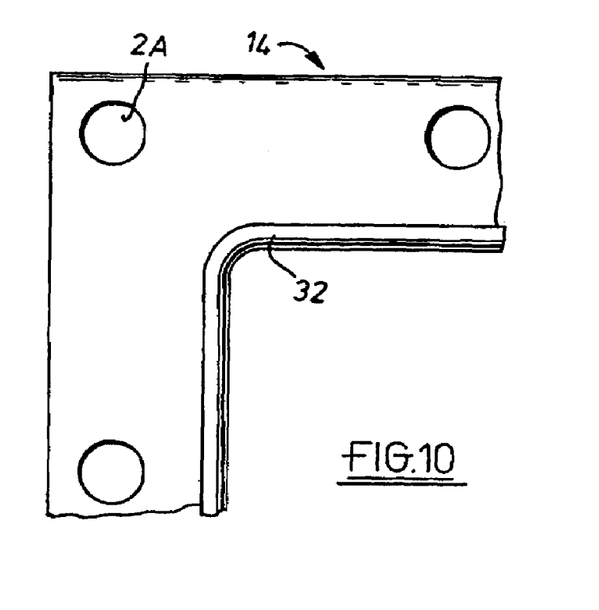
FIG. 10 is an enlarged detail view of part of the gasket in FIG. 9.
Figure 11:
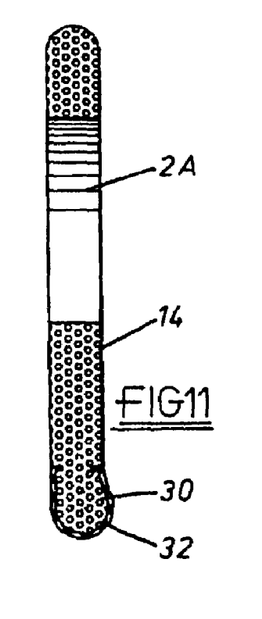
FIG. 11 is a cross-sectional view of the gasket.

Referring now to FIGS. 9 to 11, each gasket (14) may be of generally rectangular configuration with holes (some of which are depicted by reference numeral 2A) for registry with the holes in the flanges (2) so that the gaskets are compressed as the electrode structures are drawn together to clamp the separator/membrane (13) therebetween. Each gasket is locally enlarged at its inner periphery to form a nose (30) which projects beyond the plane of the gasket on one side thereof. The gaskets are assembled to the electrode structures (8) with their noses (30) in contact with the adjacent face of the membrane (13). In the region of contact with the membrane (13), each nose (30) may be of generally part-circular configuration in cross-section. By virtue of this localised enlargement of the gaskets, as well as being compressed between and sealed by the adjacent planar faces of the gaskets, the membrane (13) is additionally pinched between the noses (30) thereby producing a pinch seal which is particularly effective in preventing seepage or "wicking" of cell liquors through or along the structure of the membrane (13).

The gaskets (14) are also provided at their inner peripheries with a liner (32) of chemically resistant material such as PTFE. In a modification, each gasket may be provided with a nose or protrusion on the opposite side thereof for engagement with a respective flange (2).

When an anode or cathode plate of the electrode structure is in need of refurbishment or replacement, it may be removed from the structure by removing the cushions (9) to expose the central sections (40) of the spiders (7) and thereby allow their detachment from the posts or, where no posts are present, from the electrode pan or bipolar plate. For example, where the central portions of the spiders are welded, e.g. spot welded, detachment may be effected by trepanning through the spot weld using a drill or milling tool. Where the central spider portions are engaged with the posts (or pan) via a fixing screw or push fit connector, detachment is effected by removing the screw or other connector. In some cases, the welding system employed to attach the central spider portions may be designed to give only weak welded joints so that the spiders may be detached from the posts, pan or bipolar plate simply by breaking the welded joints using physical force. Once the spiders have been detached, the anode or cathode can then be removed for refurbishment or replacement with a fresh electrode assembly comprising an anode or cathode with an array of spiders arranged to correspond with the locations of the posts or projections (if no posts are present). The new or refurbished electrode assembly is then physically and electrically reattached, for example by spot welding, threaded fasteners or push-fit connectors.

Where the method of attachment does not involve welded joints, e.g. threaded fasteners or push fit connectors, conduction enhancing means such as star washers, abrasion discs or conductive coatings, may be inserted between or applied to the central portion of the spider and/or the surface of the post, pan or bipolar plate. Optionally where needed to secure a good physical and electrical join to the replacement anode or cathode, the rough surfaces of the post, pan or bipolar plate exposed by removal of an electrode structure may be dressed using for example a linishing tool, sanding tool, file or the like.

What is claimed is:

1. A gasket comprising a substantially square or rectangular monolithic frame comprised of a plasticized resin, and having an inner peripheral edge, said inner peripheral edge being part-circular in cross-section, an outer peripheral edge, an upper surface and a lower surface, the inner peripheral edge including a nose or protrusion comprised of said resin wherein said nose or protrusion projects beyond said upper or said lower surface, and being provided with a liner of chemically resistant material conforming with said nose or protrusion and a portion of the frame in addition to said nose or protrusion.

2. A gasket as claimed in claim 1, in which the liner is made of polytetrafluoroethylene.

3. A gasket as claimed in claim 1 provided with holes to accommodate sealing bolts.

4. A gasket as claimed in claim 1 in which the opposite faces of the gasket are planar.

5. A gasket as claimed in claim 1, in which the protrusion or nose extends around substantially the entire perimetral length of the frame.

6. A gasket as claimed in claim 1, which the protrusion or nose is provided on the inner peripheral edge of the gasket frame.

7. A gasket as claimed in claim 1, in which the protrusion or nose is of curved bulbous configuration.

8. A gasket as claimed in claim 1 in which the protrusion or nose is of a shape capable of effecting a pinch seal when used with a second gasket in the form of a frame having an inner peripheral edge and an outer peripheral edge, the inner peripheral edge of the gasket being of continuously curved convex configuration and being provided with a liner of chemically resistant material conforming with the continuously curved inner peripheral edge.

9. A gasket as claimed in claim 1 in which the gasket is provided with a protrusion or nose on opposite sides thereof.

10. A gasket as claimed in claim 1 in which at least one side of the gasket is planar and wherein the frame is locally enlarged at its inner peripheral edge to form said nose which projects beyond the plane of the gasket on said at least one side thereof to effect sealing contact.

11. A gasket as claimed in claim 1 adapted to mate with a second gasket, wherein said frame is suitable for compression together with the frame of a second gasket of similar configuration between a pair of flanges, the protrusion being resilient for effecting a pinch seal with a similar protrusion on a second gasket.

12. The gasket of claim 1 wherein the cross-section of the frame is of rectangular cross section with the dimension perpendicular to the gasket plane being smaller than the dimension in the plane of the gasket.

13. The gasket of claim 1 wherein said liner is of substantially uniform thickness.

14. A gasket according to claim 1, wherein the plasticized resin comprises an EPDM resin.

15. A gasket according to claim 1, wherein the liner is U-shaped and wherein the interior space defined by the U-shaped liner is substantially completely filled with the material of which the frame is composed.

* * * * *